Aug. 21, 1928.　　　　F. B. SMITHE　　　1,681,504
LIQUID LEVEL GAUGE
Filed July 28, 1925　　　2 Sheets-Sheet 1

INVENTOR
Frank B. Smithe
BY
ATTORNEYS

Aug. 21, 1928.
F. B. SMITHE
LIQUID LEVEL GAUGE
Filed July 28, 1925   2 Sheets-Sheet 2
1,681,504
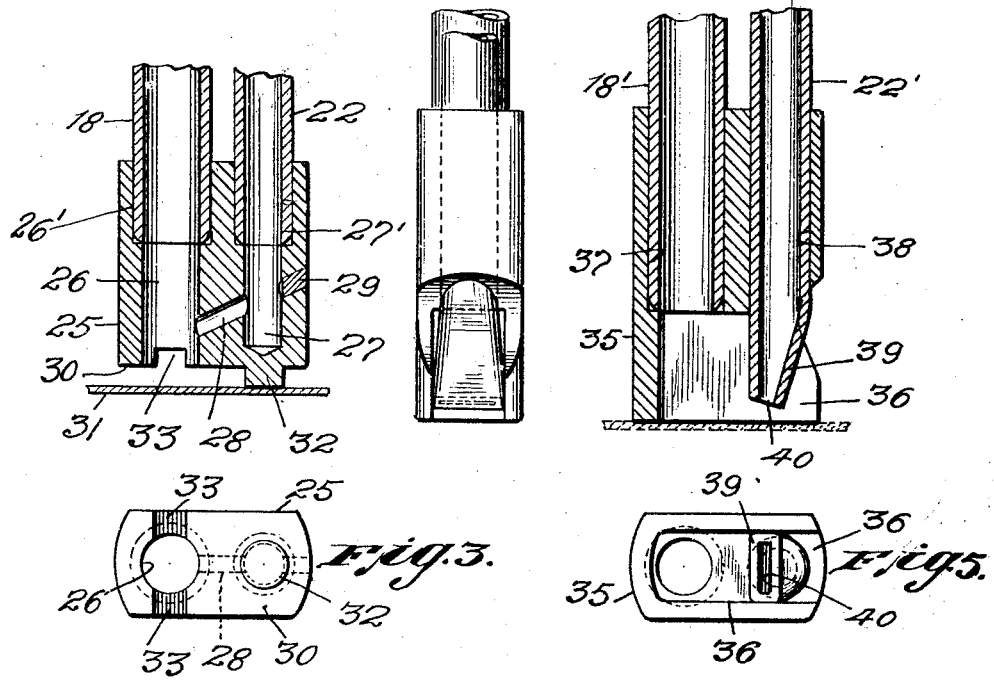
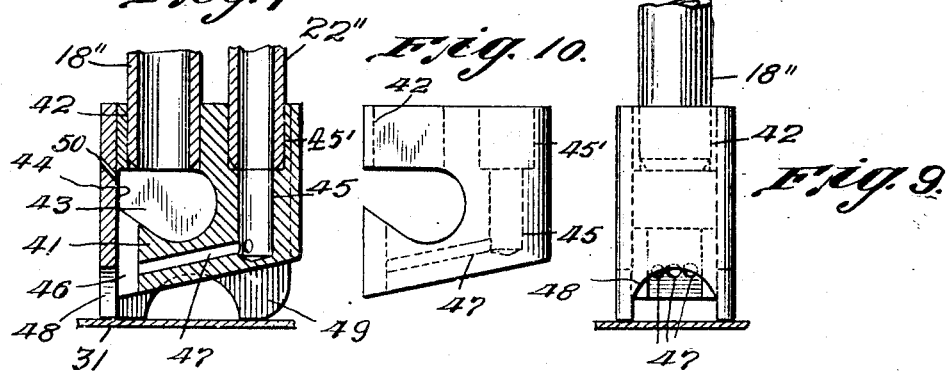
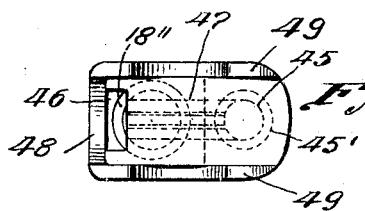
INVENTOR
Frank B. Smithe
BY
ATTORNEYS Patented Aug. 21, 1928.

1,681,504

UNITED STATES PATENT OFFICE.

FRANK B. SMITHE, OF NEW YORK, N. Y., ASSIGNOR TO F. L. SMITHE MACHINE CO., INC., OF NEW YORK, N. Y., A CORPORATION OF NEW YORK.

LIQUID-LEVEL GAUGE.

Application filed July 28, 1925. Serial No. 46,530.

The present invention relates to tank instruments for liquid level gauges, and is more particularly directed toward a form of instrument suitable for use in connection with liquid level gauges of the type utilizing a vented manometer and trapped air column for gauging the fuel supply of an internal combustion engine on an automotive vehicle. It is, of course, to be understood that the invention is susceptible of use in other arts, and that the following description of its use in connection with automobile fuel systems is merely illustrative.

Automobiles are generally equipped with a gasoline supply tank and a vacuum operated fuel system for intermittently raising the fuel from the supply tank into a vacuum tank, from which it is fed to the carburetor by gravity. The most convenient location for a gauge for the fuel supply is on the dashboard of the car, for in this place it may be observed by the driver at any time, without inconvenience.

In a co-pending application of Francis B. Smythe and Abraham Novick, Serial Number 540,999, filed March 4, 1922, there is described a device suitable for giving a dashboard indication of the fuel supply. This device comprises a pneumatically operated gauge, and a mechanism whereby the indication of the gauge is reset intermittently in order to eliminate errors which operate to affect the indications of all gauges of this general nature, as is well understood by those versed in the art. The resetting is accomplished by intermittently interrupting the operation of the gauge and restoring a predetermined datum pressure in the air line which connects the gauge with the fuel tank during such period of interruption.

This resetting operation is preferably carried out by utilizing the suction of the vacuum fuel system. The supply tank is connected with both the vacuum tank and the indicating device through piping or tubing so arranged that the suction in the vacuum tank line interrupts the operation of the gauge by withdrawing the liquid column in the piping leading to the gauge.

For manufacturing purposes it has been found desirable to provide a tank instrument which embodies a suitable arrangement to facilitate the interconnecting of the suction line and the piping leading to the gauge, and the present invention contemplates an instrument for these purposes which is susceptible of quantity production at low cost.

An object of the present invention is to provide a tank instrument for liquid level gauges wherein the instrument comprises a member provided with suitable holes or other means for receiving or connecting the piping, and passages for the flow of fuel and air during the operation of the vacuum fuel system and the gauging of the fuel.

Another object of the invention is to provide a tank instrument suitable for use in connection with tanks of various sizes, and also one which is provided with passages so disposed that the tank instrument may rest on the bottom of the tank without interfering with the passage of the fuel.

The invention also contemplates a strong, rugged tank instrument for liquid level gauges which will hold the parts in position, and in which there is a minimum likelihood of derangement of parts.

Other objects of the invention will be apparent as the description proceeds.

In the accompanying drawings one form of liquid level gauge is shown, together with several of the many possible forms of tank instruments designed more particularly for use with such a gauge. It is of course understood that the drawings are merely illustrative of the invention which may be embodied in various forms.

In these drawings:

Figure 2 is a vertical section of one form of tank instrument;

Figure 3 is an inverted plan view of Figure 2;

Figure 4 is a vertical section of a modified form of tank instrument;

Figure 5 is an inverted plan view of Figure 4;

Figure 6 is an end elevation of the part of the mechanism shown in Figure 4;

Figure 7 is a vertical section of a further modified form of tank instrument;

Figure 8 is an inverted plan view of Figure 7;

Figure 9 is an end elevation of Figure 7; and

Figure 10 is an elevational view of one part of the instrument shown in Figures 7 to 9, inclusive.

Figure 1:
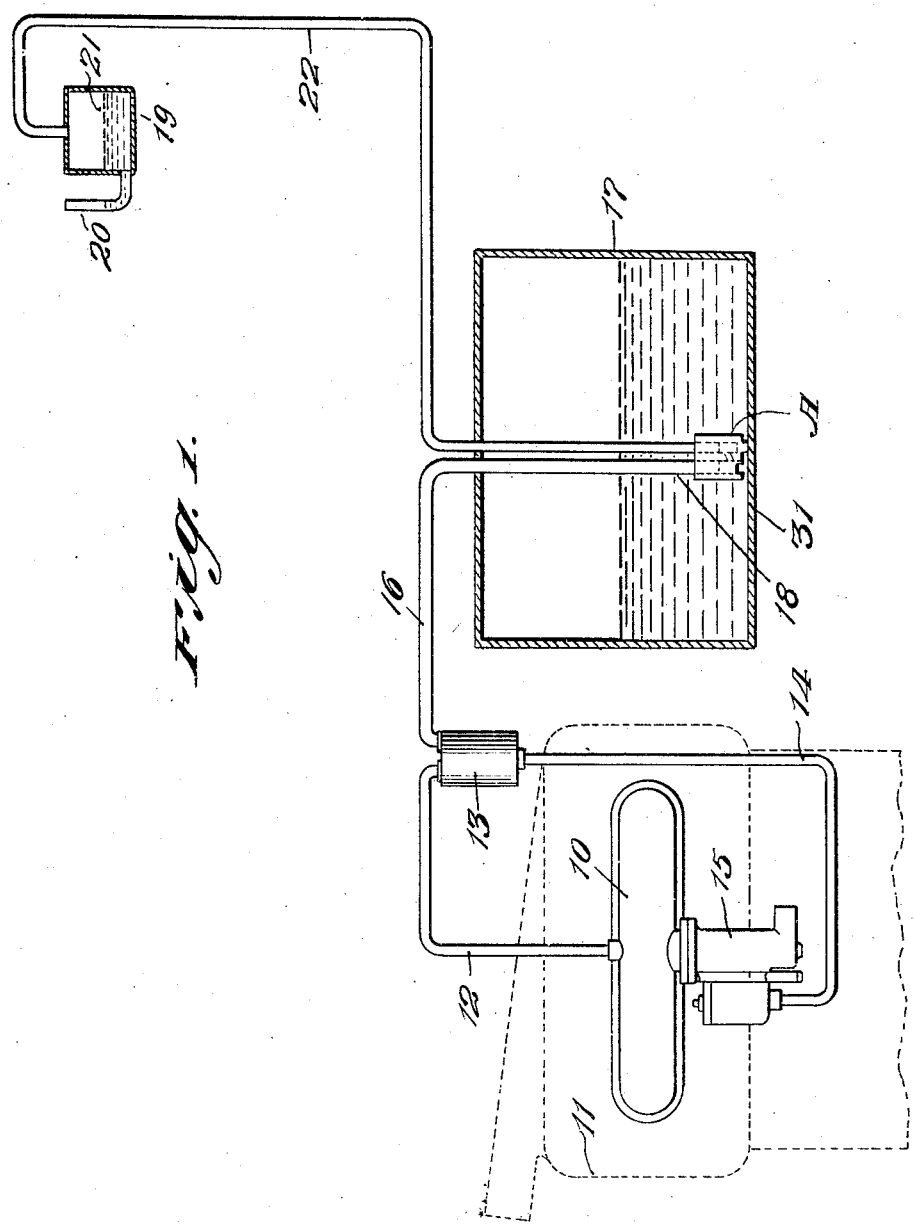
Figure 1 is a diagrammatic view showing a gauge connected up to an internal combustion engine.

The intake 10 of an internal combustion engine 11 is connected in the usual manner by a tube 12 with the vacuum tank 13 situated above the engine so as to feed fuel through the tube 14 to the feed chamber of the carburetor 15. The vacuum tank is connected by a tube or suction line 16 to the main or storage tank 17 carried on the rear of the vehicle, as is customary. Inasmuch as the structural details at the top of the tank 17 form no part of the present invention, they are omitted from the drawing.

A tank instrument, designated generally by the letter A is placed inside the tank near the bottom thereof. It is connected with the lower end 18 of the suction line and provided with suitable passages, to be described, for permitting the withdrawal of the liquid from the tank 17.

A liquid filled manometer 19 having a vented indicating leg 20 and a storage chamber 21 is connected by a gauge line tube 22 with the tank instrument A. This gauge line provides a trapped air column which extends from the storage chamber to the tank instrument A. Suitable passages, to be described, are provided in the tank instrument for permitting the manometer to be actuated by the hydrostatic pressure at the lower end of the gauge line, and for permitting the withdrawal of the trapped air from the gauge line for the purpose of resetting the gauge. This resetting operation is brought about by the intermittent operation of the vacuum fuel system, and restores the air in the tube 22 to a predetermined datum pressure.

The form of tank instrument shown in Figures 2 and 3 is conveniently made up from a metal block 25. It is provided with a passage 26 extending from the top to the bottom of the block and enlarged at the top as shown at 26' for the reception of the lower end 18 of the suction line. It is also provided with a drilled passage 27 closed at the bottom and enlarged at the top as shown at 27' to receive the lower end of the gauge line tube 22. These tubes may be soldered to the block. A downwardly sloping drilled passage 28 interconnects the passages 26 and 27 and forms a passage or conduit for the interchange of air and liquid. This drilled passage 28 is plugged as shown at 29. In order to space the lower face 30 of the block above the bottom 31 of the tank 17, the block may be provided with a spacing projection 32. The lower surface of the block is also preferably cut away as shown as 33 to provide lateral passages communicating with the passage 26. These facilitate the entrance of the fuel into the suction line.

In the form of construction thus described, the vacuum tank is filled in the usual manner and each time the suction is applied to withdraw fuel from the tank 17, the liquid in the lower part of the tube 22 and the passages 27 and 28 is sucked out due to the fact that the pressure tending to maintain the liquid in the tube is withdrawn and suction is applied thereto instead. Air is admitted through the vented end of the manometer and passes through the tubing 22. This restores the trapped air column to a predetermined datum pressure, and effects a resetting of the gauge.

In the form of tank instrument shown in Figures 4, 5 and 6, a block 35 is provided with a side opening recess 36 in its lower face and with vertical passages 37 and 38 extending from the top of the block down to said recess. The suction line 18' is fastened as by soldering into the left hand passage while the gauge tube 22' is passed through the right hand passage. The lower end 39 of the tube 22' is preferably constructed, in the manner indicated, and beveled as shown at 40 to facilitate the sucking out of the liquid in this tube, when the vacuum tank operates. This form of tank instrument is preferably placed in contact with the bottom of the tank, as indicated. The operation is similar to that already described.

Figures 7 to 10 inclusive show a modified form of tank instrument. Here a metal block 41 is provided with a passage 42 for the suction line 18" which leads into a cavity 43 extending to the side face 44 of the block and with a passage 45, enlarged at 45' for the reception of the gauge tube 22". The side face 44 of the block is provided with a channel 46 below the cavity 43, and oblique passages 47 run from this channel to the passage 45. This form of block is provided with a U-shaped cover member 48 which may be suitably fastened in place. It will be noted that this member provides a wall of the cavity 43 and channel 46 so that the fuel passage extends to the lower face of the block. The lower portion 49 of the cover member has an irregular configuration such as indicated to provide lateral passageways for the fuel. A small vent may be provided, if desired, to allow air bubbles to escape from the chamber.

What is claimed is:

1. In a tank instrument for liquid level gauges, a suction pipe, a gauge pipe, a block connected to said pipes, said block having a passage therein which communicates with the suction pipe and is adapted to open into the tank at the lower side of the block when the latter is in operative position in the tank, and a second downwardly extending passage which communicates with the gauge pipe and with the first mentioned passage, the passages being so inter-related that the application of suction to the suction pipe will withdraw liquid from the gauge pipe.

2. In a tank instrument for liquid level gauges, a suction pipe, a gauge pipe, a block connected to said pipes, said block having a passage therein which communicates with the suction pipe and is adapted to open into the tank at the lower side of the block when the latter is in operative position in the tank, and a second downwardly extending passage which communicates with the gauge pipe and with the first mentioned passage, the passages being so inter-related that the application of suction to the suction pipe will withdraw liquid from the gauge pipe, said block also having a lateral channel in its lower side in communication with the first passage.

3. In a tank instrument for liquid level gauges, in combination, a suction pipe, a gauge pressure pipe, and a block into the upper side of which the two pipes extend, said block having a passage communicating with the suction pipe and extending to the lower side of the block, and a passage communicating with the gauge pressure pipe and leading into the first passage.

4. In a tank instrument for liquid level gauges, a block having an upwardly and downwardly opening vertical passage therein, a suction pipe extending into the passage, a second upwardly opening vertical passage in the block, a gauge pressure pipe extending into the second mentioned passage, there being a lateral passage in the lower face of the block in communication with the first passage, and an interconnecting passage leading from the first to the second passage, said passages being so interrelated that the application of suction to the suction pipe will withdraw liquid from the gauge pressure pipe when the instrument is submerged in a tank.

5. In a tank instrument for liquid level gauges, a block having a pair of upwardly extending passages for connecting pipes, one only of the passages being open at the bottom, and a passage connecting the two first mentioned passages and so disposed that sucking liquid upwardly through the downwardly opening passage will draw it downwardly through the other.

6. In a tank instrument for liquid level gauges, a block having a pair of passages for connecting pipes, one only of the passages being open at the bottom, there being a passage connecting the two first mentioned passages and so disposed that sucking liquid upwardly through the downwardly opening passage will draw it downwardly through the other, and a lateral passage in the lower face of the block in communication with the downwardly opening passage.

7. The combination with a liquid storage tank, a vacuum feed fuel system for withdrawing liquid from said tank, and a liquid level gauging means for gauging the liquid in said tank, said system and gauging means each including a tube extending from the top of the tank down toward the bottom of the tank, of a metal block attached to both of the tubes, and having passages communicating with the feed system tube and the gauge tube, respectively, and interconnected with one another in such manner that the application of suction to the fuel system tube to draw liquid from the tank will draw air through the gauge tube, the first mentioned passage being open at a point below that at which it communicates with the latter passage.

8. The combination with a liquid storage tank, a vacuum feed fuel system for withdrawing liquid from said tank, and a liquid level gauging means for gauging the liquid in said tank, said system and gauging means each including a tube extending from the top of the tank down toward the bottom of the tank, of a metal block attached to both of the tubes, and having passages communicating with the feed system tube and the gauge tube, respectively, and interconnected with one another in such manner that the application of suction to the fuel system tube to draw liquid from the tank will draw air through the gauge tube, said block also having a lateral passage in the lower face thereof leading to the first mentioned passage.

9. The combination with a liquid storage tank, a vacuum feed fuel system for withdrawing liquid from said tank, and a liquid level gauging means for gauging the liquid in said tank, said system and gauging means each including a tube extending from the top of the tank down toward the bottom of the tank, of a metal block attached to both of the tubes, and having a passageway extending from the fuel system tube to the lower side of the block, and a second passageway including a downwardly sloping passage interconnecting the gauge tube and the first passageway.

10. The combination with a liquid storage tank, a vacuum feed fuel system for withdrawing liquid from said tank, and a liquid level gauging means for gauging the liquid in said tank, said system and gauging means each including a tube extending from the top of the tank down toward the bottom of the tank, of a metal block attached to both of the tubes, and having a passageway extending from the fuel system tube to the lower side of the block, a second passageway including a downwardly sloping passage interconnecting the gauge tube and the first passageway, and a lateral passage in the lower face of the block and leading to the first passageway.

In testimony whereof I have affixed my signature to this specification.

FRANK B. SMITHE.